H. S. BOYLE.
MILK PAIL.
APPLICATION FILED JULY 28, 1915.

1,171,833.

Patented Feb. 15, 1916.
2 SHEETS—SHEET 1.

Inventor
Harry S. Boyle
by
Attorney

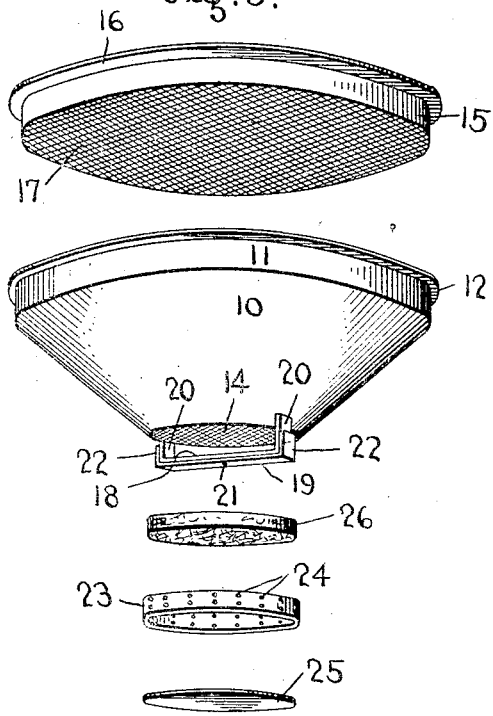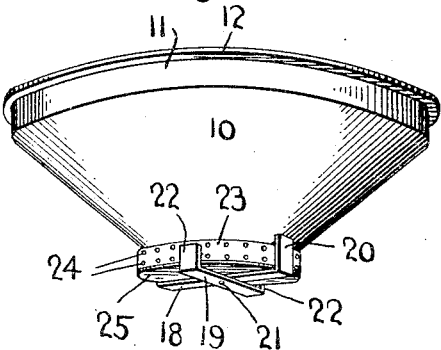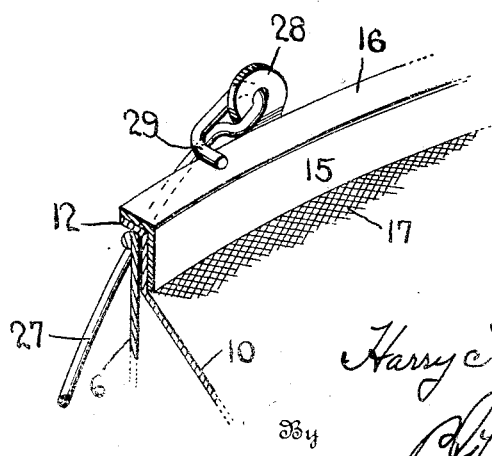

UNITED STATES PATENT OFFICE.

HARRY SCHILLING BOYLE, OF NORTH PLATTE, NEBRASKA.

MILK-PAIL.

1,171,833.

Specification of Letters Patent.

Patented Feb. 15, 1916.

Application filed July 28, 1915. Serial No. 42,300.

*To all whom it may concern:*

Be it known that I, HARRY SCHILLING BOYLE, a citizen of the United States, residing at North Platte, in the county of Lincoln and State of Nebraska, have invented new and useful Improvements in Milk-Pails, of which the following is a specification.

The present invention relates to milk pails, and the object is to provide a simple and effective structure that will permit the ready passage of milk into the pail, and will prohibit the entrance of dirt, dust, or other undesirable material, said means being readily detached, so that it can be cleaned and also preventing danger of the spilling of the milk.

An embodiment of the invention that is considered the preferable one is illustrated in the accompanying drawings, wherein:—

Figure 1:
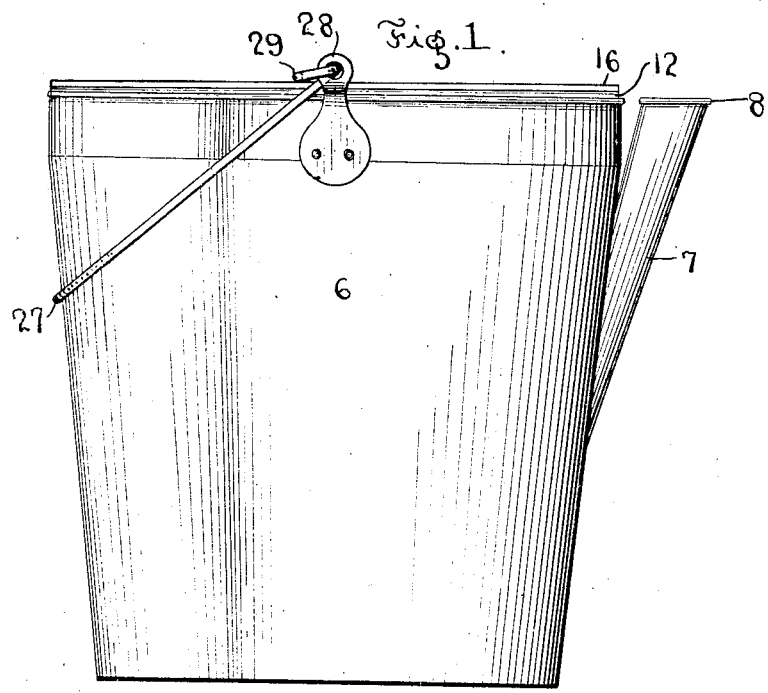
Figure 2:
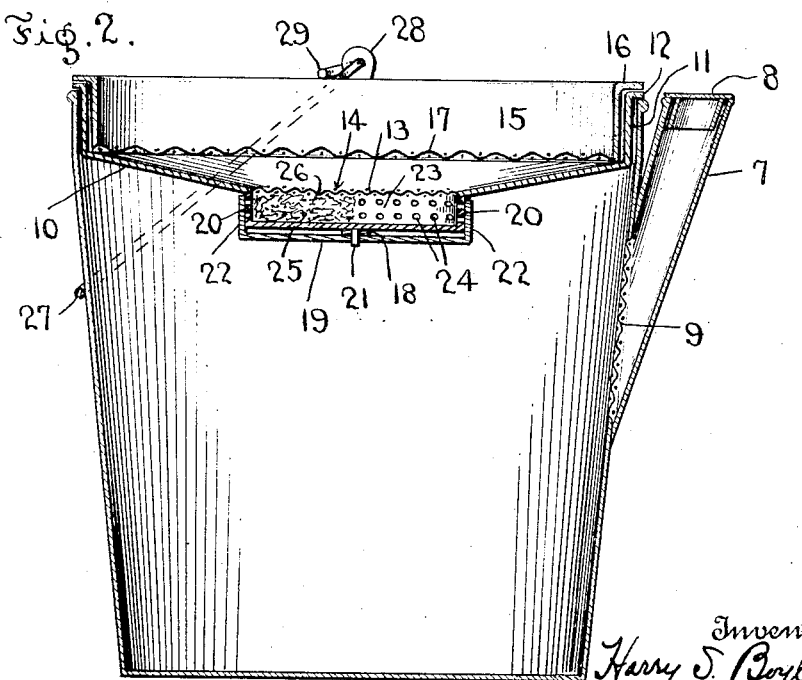

Figure 1 is a side elevation of the pail. Fig. 2 is a vertical sectional view therethrough. Fig. 3 is a detail perspective view of the cover, with the various strainer elements detached. Fig. 4 is a similar view with the parts assembled. Fig. 5 is a detail perspective view of the rim portion of the pail, showing the means for holding the cover in place.

Similar reference numerals designate corresponding parts in all the figures of the drawings.

In the embodiment illustrated, the pail includes a body or container 6 preferably of sheet metal and tapering toward its lower end. This container is provided with a suitable pouring spout 7, in which is located a removable cap 8. A screen 9 is preferably located across the inner end of the spout.

The open top of the container is normally closed by a cover comprising a plurality of sections, one of these sections being in the form of a depending inverted cone member 10 having an upstanding margin 11 that fits snugly within the upper margin of the container and has an outstanding flange 12 that rests thereon. This member 10 is provided with a central milk-receiving opening 13, across which extends a screen 14, which is secured to the member 10. A ring member 15 fits snugly within the marginal portion 11 of the member 10, and has an outstanding flange 16 that rests upon the flange 12. This ring member has secured to its lower edge a screen 17 which thus extends entirely across the member 10, as will be evident by reference to Fig. 2.

The member 10 is provided on its under side and across the milk-receiving opening 14 with a pair of arms, respectively designated 18 and 19. The arm 18 has upstanding terminals 20 fixed by solder, or other suitable means to the member 10 on opposite sides of the opening. The other arm 19 is pivoted at its center and as shown at 21 to the central portion of the arm 18, and has upstanding terminals 22 free from the member 10. Detachably fitting within and embraced by said arms is a strainer ring 23 of sheet metal, and perforated, as illustrated at 24. A bottom 25, which may or may not be perforated, is provided for the ring 23, and is arranged to be fitted within the arms beneath said ring, as will be clear by reference to Fig. 2. The ring 23 constitutes a container or holder for filtering or straining material 26, which material may be cotton, linen, or other suitable substance.

In assembling the parts, the ring 23, with the material 26 therein and the bottom 25, are placed upon the arm 18, when the arm 19 is arranged parallel thereto and beneath the same, as shown in Fig. 3, after which the arm 19 is turned to a position at right angles to the arm, 18, whereupon the parts will be effectively held in position. If now the parts 19 and 20 are introduced into the top of the pail, it will be evident that an effective screen and filter is provided, which while permitting the passage of milk into the container, will prohibit the entrance of dirt or other objectionable matter. The milk in order to gain access to the container 6 has to pass through the screen 17, the screen 14, the filtering material 26 and the screen ring 24, so that it is properly cleansed. Moreover the spout 7 being closed by the cap 8 and the screen 9, nothing objectionable can enter therethrough.

While the parts also will prohibit any rapid outflow of milk, should the pail become upset, these parts are furthermore held together in assembled position by means of an extension of the bail 27, said bail as shown being pivoted in ears 28 suitably secured to the bucket, and the terminals of said bail are inturned as shown at 29, so as to overlie the flanges 12 and 16. Consequently when the bail is in its lowered position, the terminals 29 constitute locks for maintaining the cover members in position on the container.

From the foregoing, it is thought that the construction, operation and many advantages of the herein described invention will be apparent to those skilled in the art without further description, and it will be understood that various changes in the size, shape, proportion and minor details of construction, may be resorted to without departing from the spirit or sacrificing any of the advantages of the invention.

Having thus fully described my invention, what I claim as new and desire to secure by Letters Patent, is:—

1. In a milk pail, the combination with a container, of a cover therefor having a milk-receiving opening and a screen across the same, a detachable strainer ring surrounding the opening beneath the cover, a bottom for said ring, strainer material in said ring on said bottom, said ring, bottom and strainer material being movable laterally to and from a position beneath the opening and screen, and means for detachably holding the ring, the bottom and the material in place beneath said opening and screen.

2. In a milk pail, the combination with a container, of a cover therefor comprising a depending conical member having a central milk-receiving opening and a screen across the same, a detachable strainer ring surrounding the opening beneath the cover and screen, a bottom for said ring, strainer material in said ring on said bottom, crossed arms extending beneath the bottom and having upstanding portions located alongside the ring, one of said arms having its ends secured to the cover on opposite sides of the opening, and a pivotal connection between the central portions of the arms that permits the other arm to swing to a position alongside the secured arm and permit the ring, bottom, and strainer material to be slipped sidewise to and from a position on the fixed arm beneath the screen.

In testimony whereof I have hereunto set my hand in presence of two subscribing witnesses.

HARRY SCHILLING BOYLE.

Witnesses:
I. J. JESSUP,
J. C. HOLLMAN.